N. H. DAVIS.
BRAKE BEAM SUSPENSION.
APPLICATION FILED OCT. 30, 1911.
1,028,443.
Patented June 4, 1912.
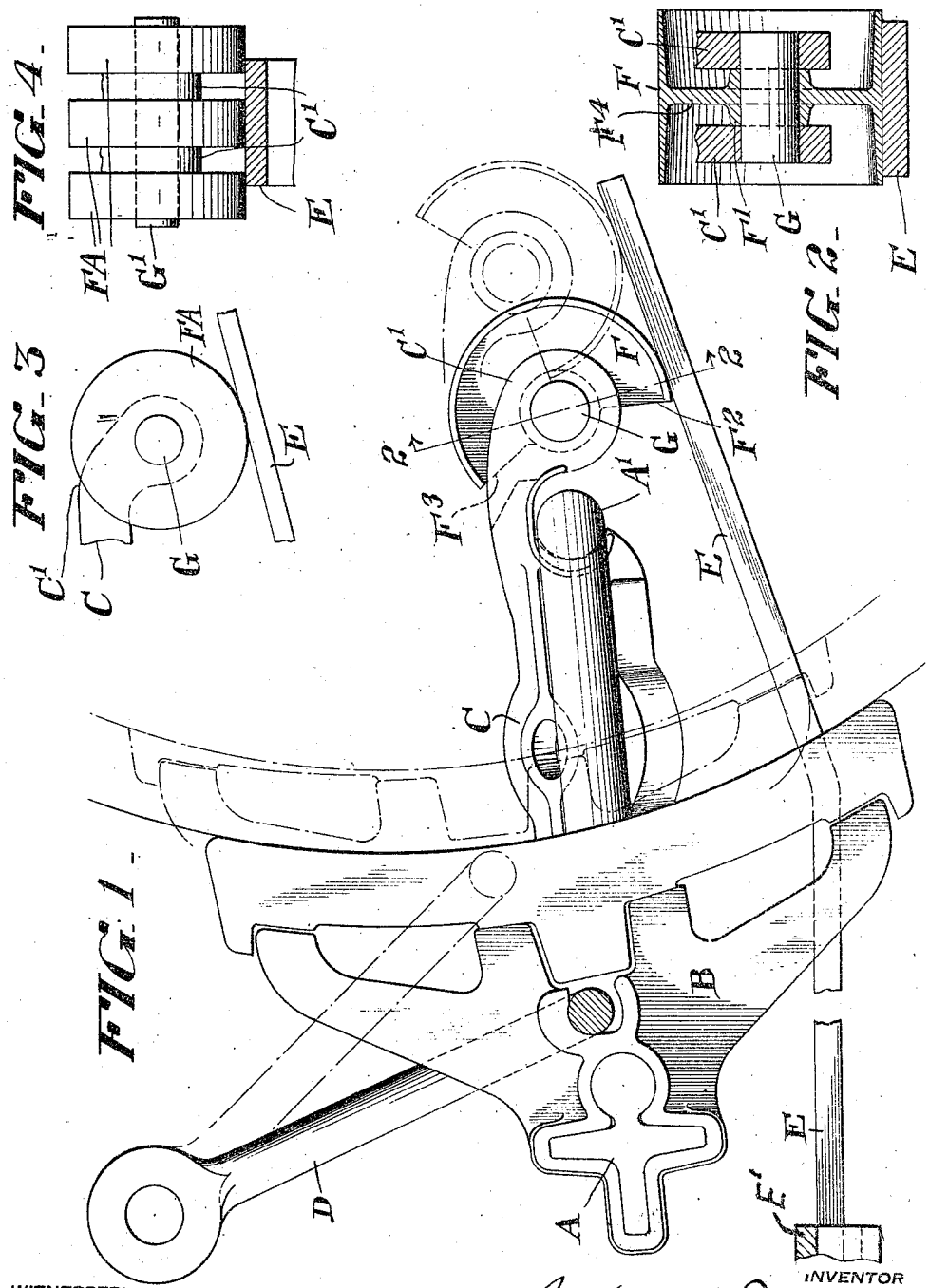

UNITED STATES PATENT OFFICE.

NATHAN H. DAVIS, OF PHILADELPHIA, PENNSYLVANIA.

BRAKE-BEAM SUSPENSION.

1,028,443.  Specification of Letters Patent.  Patented June 4, 1912.

Application filed October 30, 1911. Serial No. 657,398.

*To all whom it may concern:*

Be it known that I, NATHAN H. DAVIS, a citizen of the United States of America, residing in the city and county of Philadelphia, in the State of Pennsylvania, have invented a certain new and useful Improvement in Brake-Beam Suspension, of which the following is a true and exact description, reference being had to the accompanying drawings, which form a part thereof.

My present invention relates to the means for suspending railway brake beams and particularly to what is known as the third suspension of said beams.

The main objects of the invention are, to provide a simple and effective third suspension for brake beams adapted to accommodate the large relative movement between the brake beam proper and the axle of the wheels braked consequent on the large amount of wear in the brake shoes and the wheels now permitted in many cases before the shoes and wheels need be discarded as worn out, and to prevent an undesirable presentation of the brake shoes to the car wheels at any stage; and to accomplish this with a minimum of frictional resistance to each brake application and release and particularly the latter; and to provide a third suspension, having the characteristics set forth above, and which permits of the use of a brake beam adapted for interchangeable use with my improved third suspension, or the standard swinging link third suspension now in common use.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which my invention may be embodied.

Of the drawings, Figure 1 is a side elevation of a brake beam provided with one form of my improved third suspension. Fig. 2 is a section on the line 2—2 of Fig. 1. Fig. 3 is an elevation of a portion of a brake beam and third suspension in which the latter differs slightly from that shown in Figs. 1 and 2. Fig. 4 is an elevation taken at right angles to Fig. 3, of the apparatus shown in the latter figure.

In the drawings, and referring first to the construction shown in Figs. 1 and 2, A, represents a brake beam of well known type, and B, the brake heads secured to the ends of the beam. C, represents the post or strut which extends between the compression member of the brake beam and the tension member A' thereof, and to which the brake lever (not shown) is ordinarily connected. D, represents the usual links, one at each end of the brake beam through which the beam is suspended at its ends from the truck. E, represents a spring track element adapted to be secured to the spring plank E' of the truck.

As shown in Figs. 1 and 2, a portion of the post C extends in front of the tension member A' of the brake beam; and is shaped to provide a pair of apertured ears C'. A rolling element F is journaled to the ears C' by a pin or journal shaft G passing through the eyes in said ears. The rolling element F normally bears upon the spring track member E, and in conjunction with the latter forms the third suspension for the brake beam. As shown, the roller element F is in the form of a wheel having a web portion F$^4$ extending between the ears C' and connecting the hub of the wheel to the rim, the latter being of such width as to overlap both ears C'. To permit of sufficient turning movement of the wheel F relative to the beam, the wheel is cut away on the lines F$^2$ and F$^3$. With the construction shown in Figs. 1 and 2, it is possible to make the track engaging rim of a single track engaging third suspension wheel of a width to provide ample bearing contact between the wheel and track, and to permit of substantial lateral movement of the beam without affecting the operative engagement between the wheel F and the track member E.

I prefer to have the eye or eyes receiving the pin G so located that the beam may be used interchangeably either with the usual link third suspension heretofore in common use or with the roller suspension of my present invention. This requires in general, that the pin G be located comparatively close to the tension member A' of the beam. With the construction shown in Figs. 1 and 2, the pin G may be located as close to the tension member A' of the beam as may be desired, while at the same time the diameter of the wheel may be large enough to permit of sufficient clearance distance between the brake beam proper and the track member E. The relatively large diameter of the wheel F is advantageous also in that it reduces friction.

In Fig. 1 the full line position may be assumed to represent the brakes in the released position of the brake beam when the brake shoes and wheel are unworn, and the dotted line position to represent the brakes in the applied position of the beam at the stage when the brake shoes and wheel are about worn out. It will be observed that the wheel F has sufficient freedom for turning to form a rolling support for the front end of the brake beam throughout the entire range of movement of the latter. In consequence, the frictional resistance to the movements of the brake beam carrying the brake shoes toward and away from the car wheels on each brake application and release is practically negligible. The portion of the track E should be so shaped and disposed that the faces of the brake shoes will always be held substantially concentric with the car wheels with which they coöperate.

In the construction shown in Figs. 3 and 4, I employ in lieu of the one roller segment F of Fig. 1, three complete roller disks F A arranged one between the two ears C' and the others at the opposite side of the ears, and all journaled on the same shaft G. This construction provides a roller element having the proper aggregate track engaging width and permits of the use of complete disks or wheels having the maximum diameter possible with a given distance between the pin G and the tension member A' of the brake beam.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions, certain features of the invention may be used without a corresponding use of others.

Having now described my invention what I claim as new and desire to secure by Letters Patent, is:

1. The combination with a trussed brake beam having a strut, of a roller element journaled to said strut adjacent the connection of the latter to the tension member of the beam, and a truck supported track element on which said roller element runs.

2. The combination with a brake beam formed with the usual eye for a third suspension, of a roller element having a journal received in said eye, and a truck supported track element on which said roller runs.

3. The combination with a brake beam formed with an eye located and adapted to receive a pin connecting the beam to a swinging third suspension link, of a roller element having a journal received in said eye, and a truck supported spring track element on which said roller runs.

4. The combination with a brake beam proper having a portion extending transversely to the length of the beam, of a roller journaled to said portion and comprising a web laterally displaced from said portion, and a rim overlapping said portion, said roller being cut away to permit of a partial revolution of said roller relative to the beam proper, and a truck supported spring track element on which said roller runs.

5. In a third suspension for brake beams, the combination with a brake beam proper provided with a pair of apertured ears in front of the tension member of the beam, a roller element comprising a web extending between and journaled in said ears, and a rim overlapping both ears, said rim and web being cut away to permit of a partial revolution of said roller with respect to said beam, and a truck supported track element on which said roller element runs.

NATHAN H. DAVIS.

Witnesses:
ARNOLD KATZ,
D. STEWART.